(12) United States Patent
Nedelec (10) Patent No.: US 8,431,260 B2
(45) Date of Patent: Apr. 30, 2013

(54) INTERCONNECTION SYSTEM FOR AN ENERGY STORAGE ASSEMBLY

(75) Inventor: Luc Nedelec, L'Hopital Camfrout (FR)

(73) Assignee: Batscap, Ergue Gaberic (FR)

( * ) Notice: Subject to any disclaimer, the term of this patent is extended or adjusted under 35 U.S.C. 154(b) by 463 days.

(21) Appl. No.: 11/988,959

(22) PCT Filed: Jul. 4, 2006

(86) PCT No.: PCT/FR2006/001572
§ 371 (c)(1),
(2), (4) Date: Jan. 14, 2008

(87) PCT Pub. No.: WO2007/006898
PCT Pub. Date: Jan. 18, 2007

(65) Prior Publication Data
US 2009/0035607 A1    Feb. 5, 2009

(30) Foreign Application Priority Data
Jul. 13, 2005    (FR) ..................................... 05 07527

(51) Int. Cl.
*H01M 2/30*    (2006.01)
*H01M 2/26*    (2006.01)
*H01M 2/24*    (2006.01)
*H01M 18/48*    (2006.01)

(52) U.S. Cl.
USPC ...... 429/1; 429/90; 429/92; 429/93; 429/121; 29/623.5

(58) Field of Classification Search ............... 429/1, 121, 429/90, 92, 93
See application file for complete search history.

(56) References Cited

U.S. PATENT DOCUMENTS

| 3,932,689 | A | * | 1/1976 | Watanabe et al. | 428/418 |
|---|---|---|---|---|---|
| 4,065,710 | A | * | 12/1977 | Zytka | 320/103 |
| 5,469,002 | A | * | 11/1995 | Garrett | 307/150 |
| 5,825,155 | A | * | 10/1998 | Ito et al. | 320/118 |
| 5,892,351 | A | * | 4/1999 | Faulk | 320/125 |
| 5,990,665 | A | * | 11/1999 | Kawata et al. | 320/162 |
| 6,271,644 | B1 | * | 8/2001 | Okada et al. | 320/112 |
| 6,410,184 | B1 | | 6/2002 | Horiuchi et al. | |
| 2002/0090540 | A1 | * | 7/2002 | Einhart et al. | 429/32 |
| 2003/0180606 | A1 | * | 9/2003 | Sasaki et al. | 429/125 |

FOREIGN PATENT DOCUMENTS

| EP | 0571235 A | 11/1993 |
|---|---|---|
| GB | 359441 A | 10/1931 |
| JP | 08031396 | * 2/1996 |

OTHER PUBLICATIONS

JP 08031396—Translation.*

* cited by examiner

*Primary Examiner* — Patrick Ryan
*Assistant Examiner* — Ladan Mohaddes
(74) *Attorney, Agent, or Firm* — Blakely, Sokoloff, Taylor & Zafman (57) ABSTRACT

The invention concerns an interconnection system (100) of an energy storage assembly (200), with an electronic support for controlling (300) the health status of the energy storage assembly (200), the interconnection system (101) being characterized in that it comprises an interconnection support (101) including a conductive circuit (800) formed on electrically conductive surface, said circuit (800) forming an electrical connection between the electronic control support (300) and the pole terminals (500) of the cells to which it is connected, respectively, through connecting means and through retaining means (110, 120, 150), said retaining means (110, 120, 150) being adapted to urged into contact, on the pole terminals (500), with support means (510) so as to arrange the pole terminals (500) on the interconnection support (101) and adapted to provide a direct electrical connection of the pole terminals (500) with the conductive circuit (800). The invention is applicable in high energy storage technologies such as lithium polymer technology.

35 Claims, 4 Drawing Sheets

INTERCONNECTION SYSTEM FOR AN ENERGY STORAGE ASSEMBLY

The present patent application is a non-provisional application claiming the benefit of International Application No. PCT/FR2006/001572, filed Jul. 4, 2006.

FIELD OF THE INVENTION

The field of the invention concerns the technologies of energy-storage assemblies. More precisely, this present invention concerns a system and a method for the interconnection of an energy-storage assembly with an electronic support for controlling its health status.

The invention also concerns an energy-storage assembly that is equipped with such an interconnection system.

PRESENTATION OF THE PRIOR ART

In order to supply the necessary energy production required for most of the commercial applications of energy-storage assemblies, and particularly motor vehicle applications, a large number of technologies, called high-energy technologies, have been developed recently, such as lithium polymer technology for example.

Such technologies have characteristics that necessitate improvements on the part of the manufacturers of energy-storage assemblies, and particularly in the field of optimising the performance of connections to monitor these assemblies.

At present, in a typical method of operation of a high-energy storage assembly, it is well known that undesirable phenomena are engendered during the charging or the discharging of the assembly, when one of its component energy storage cells has characteristics that differ significantly from those of the other cells to which it is connected in order to produce the desired energy level.

A voltage spike or an overload are examples of phenomena provoked by the presence of a defective cell. These reduce performance and reduce the life expectancy of the energy-storage assembly.

According to one aspect of a conventional model of an energy-storage assembly, a programmable electronic support is incorporated into the construction in order to monitor the energy-storage cells and to protect them from these phenomena.

This support firstly acquires various characteristics of the state of health of the cells via a measurement circuit cabled to the polar terminals of each energy-storage cell of the assembly.

In addition, it monitors current diversion circuits connected to the cells, which divert the current around an individual cell when a preset voltage level is exceeded, in order to prevent any damage to the assembly.

The partially monitored electronic diversion components generally present in this type of circuit, and more particularly the power dissipation resistances, must also be cabled to the tops of each energy-storage cell.

The wired cabling system typically employed in the manufacture of conventional energy-storage assemblies is generally complicated. It also provides little flexibility for connection of the cells to the different circuits.

In addition, the fitting of the cables is awkward, costly and rather time consuming.

The cabling system is also very sensitive to the electromagnetic interference that propagates by conduction along the wires, and that engenders undesirable phenomena such as short circuits and electrical interference in the monitoring or control supports.

In addition, the unitary electronic power dissipation components, whose role is to present a high resistance to the passage of current, thus limiting the power delivered by the energy-storage cell and increasing the generation of heat within it, have very high released energy surfacic densities. Since these densities have difficulty in recovering, they damage the cells.

The invention in particular aims to overcome the drawbacks of the prior art.

One objective of this present invention is to propose a system for interconnection of the energy-storage cells of an assembly with an electronic support used to monitor the state of health of this assembly, which provides a connection that is simple, flexible, secure and reliable.

Another objective of this present invention is to supply an interconnection system that has considerable freedom of geometrical configuration, especially in three dimensions, while still retaining effective precision of the connections.

It is also desirable to propose an interconnection system that offers an obvious saving in terms of cost, weight and space, when creating an energy-storage assembly.

Another objective of this present invention is to supply an interconnection system that moderates the impact of a defective cell on the performance of an energy-storage assembly, and that offers efficient energy dissipation in this assembly.

SUMMARY OF THE INVENTION

These aims are achieved, according to the invention, by means of a system for the interconnection of energy-storage cells, connected electrically in order to form an energy-storage assembly, together with an electronic control support, with each of the said energy-storage cells being equipped on its top with polar terminals and with the interconnection system being, characterised in that it includes an interconnection support, where said support includes a conducting circuit formed on an electrically-conducting surface, said circuit forming an electrical connection between the electronic control support and the polar terminals to which it is connected respectively by the use of connection means and by the use of retention means, said retention means firstly being designed to make contact on the polar terminals, with the use of support means, so as to place the polar terminals onto the interconnection support, and in addition, that are designed to create a direct electrical connection between the polar terminals and the conducting circuit.

According to a first advantageous characteristic, the interconnection support is flexible.

According to another advantageous characteristic of the invention, the system has a conducting circuit that is configured, for each of the energy-storage cells, to have a voltage measuring circuit at the terminals of each cell with on/off switching, indicating an energy state of the cell, and a diversion circuit for the current passing through each cell with on/off switching, according to the energy state of the cell, with the said diversion circuit being determined at least by current limiting elements.

According to another advantageous characteristic of the invention, these current limiting elements are energy dissipation resistances.

In addition, the invention also concerns a method for the interconnection of several energy-storage cells, which are connected electrically so as to form an energy-storage assembly, together with an electronic control support, with each of the said energy-storage cells being equipped on its top with polar terminals, the method being characterised in that it implements an interconnection stage created at least by:

- the formation of a conducting circuit on an electrically-conducting area of a flexible interconnection support, deposited on the top of the said cells, with said circuit forming an electrical connection between the electronic control support and the polar terminals of each cell;
- the connection to said conducting circuit of the electronic control support;
- the bringing into contact of the support means of the polar terminals with the retention means of the interconnection support, so as to place the polar terminals on the interconnection support;
- the direct electrical connection of the support means of the polar terminals with the retention means of the interconnection support.

BRIEF DESCRIPTION OF THE FIGURES

The invention will be more clearly understood, and other advantages and characteristics will emerge more clearly, on reading the description that follows and which is provided by way of a non-limiting example, and with reference to the appended drawings which are as follows.

DETAILED DESCRIPTION OF THE INVENTION

Figure 1:
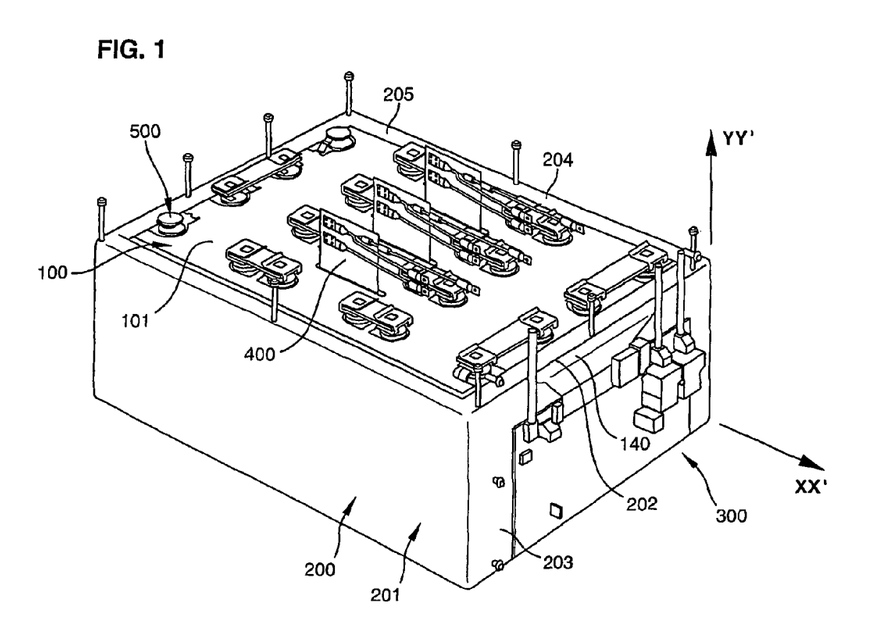
FIG. 1 illustrates a view in perspective of an energy-storage assembly equipped with the interconnection system according to the invention.

FIG. 1 illustrates an energy-storage assembly 200 formed from an arrangement of several individual energy-storage cells (not visible in the figure), placed in the empty interior of a rectangular case forming a hermetic enclosure 201.

In terms of its length, in FIG. 1 this container 201 lies along the XX' axis, and in terms of it height along the YY' axis.

The energy-storage cells each presents, at the top, two polar terminals 500 that project outside of the casing 201, on its top face 204, perpendicular to the YY' axis, with this face 204 being equipped with a top lid 205 that has a rectangular central opening.

We also see in FIG. 1 an electronic control support 300 mounted in parallel, in contact with one of the lateral faces 203 of the casing 201, perpendicular to the XX' axis. The role of this support 300 is to provide monitoring of the state of health of the different energy-storage cells, as well as of the assembly 200.

An interconnection system 100 according to the invention is placed flat onto the top face 204 of the casing 201 so as to cover the opening in the lid 205 and, more precisely, the tops of the energy-storage cells presenting the polar terminals 500.

This interconnection system 100 includes retention means for the polar terminals 500 of each cell, means for connection to the electronic control support 300, and an individual conducting circuit that will be described later with reference to FIGS. 6 and 7.

Figure 2:
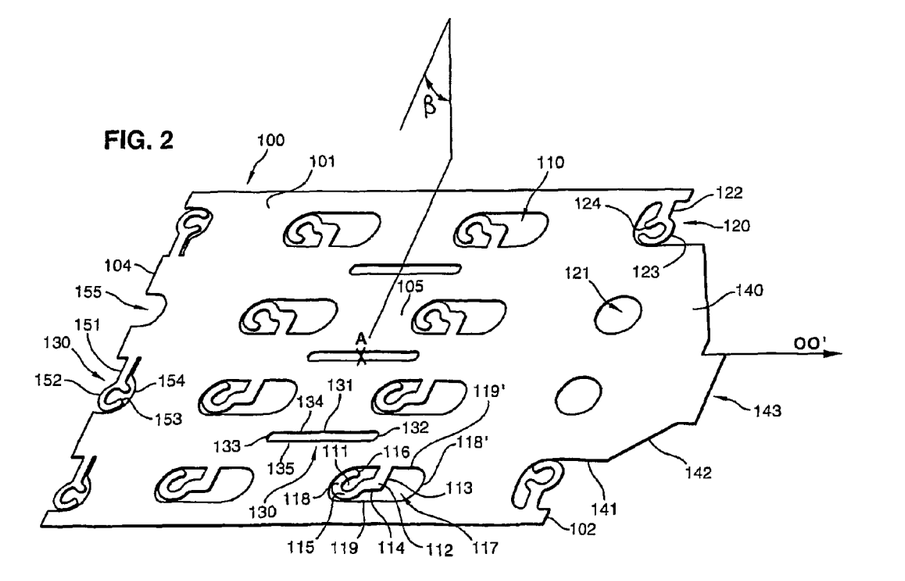
FIG. 2 illustrates a view in perspective of the interconnection system according to the invention.

As illustrated in FIG. 2, the interconnection system 100 takes the form of a thin plate 101 that is substantially rectangular.

In FIG. 2, we define a median axis OO' lying along the interconnection system 100.

The plate 101 is extended at its end 102 close to the electronic control support 300 by a connection zone 140 which is intended, by means of an electrical termination, to connect to the electronic control support 300.

This zone 140 is formed by a rectangular area 141 whose width is less than that of the plate 101, which is extended by an area 142 that converges toward the plate 101 as one moved away perpendicularly from axis OO'. It is terminated by a rectangular area 143 whose width is designed to receive the electrical termination.

In order for the interconnection system 100 to be installed in the casing 201, the connection zone 140 slides in a slot 202, provided for this purpose, on the lateral face 203 of the casing 201, which includes the monitoring means 300, and is placed flat onto the latter in order to be connected to support 300 (see FIG. 1).

The plate 101 placed flat onto the top face 204 of the casing 201, and the connection zone 140, thus form the two perpendicular portions of an elbow that is present at the end 102 close to the monitoring means 300.

In addition, according to one aspect of the invention, the interconnection system 100 includes a certain number of cut-outs forming the means for retention 110, 120 and 150 of the interconnection system 100 on the polar terminals 500 of the energy-storage cells, and fittings 130 for the reception of heating plates 400 for the energy-storage assembly 200.

The cut-outs forming means 110, 120 and 150 for the retention of the system 100 on the polar terminals 500 are placed in a selective manner and allow the latter to project from the top face 204 of the casing 201 of the energy-storage assembly 200, outside of the interconnection system 100 to the exterior.

In a preferred embodiment of the invention, their natures differ according to whether they are located on the end 102 close to the monitoring means, the end opposite 104, or on the central area 105 of the interconnection system 100.

Generally however, for all the cut-outs intended for the retention means 110, 120 and 150, the distances between each of these, along axis OO' and perpendicular to this axis, correspond respectively to the distance between the polar terminals 500 of an individual energy-storage cell and the width of a cell.

In addition, the series of cut-outs are aligned in the direction of axis OO', and in the direction perpendicular to this axis, which corresponds to the alignment of the energy-storage cells in the casing 201 of the assembly 200.

In addition, the cut-outs are constructed symmetrically in relation to the median axis OO'.

More precisely, the retention means 110 present away from the ends of the interconnection system 100 are symmetrical in relation to the point of intersection (A) of the median axis OO' with the median perpendicular plane (B), with the retention means 110 being located to either side of this plane (B).

According to a preferred embodiment of the invention, they take the form of a rectangular cut-out 110 of which two opposite sides 118, 118' are in the form of a convex circular arc, with the other two 119, 119' being rectilinear equal and parallel along the interconnection system 100.

This cut-out 110 is divided, at the middle of its length, into two parts 111 and 117 intended to accommodate two polar terminals 500 of two different cells.

One of the parts 117 is empty while the other part 111 includes a connection jumper 112 extended by a connection eyelet 115.

This jumper 112 takes the form of an elbow one of whose portions 113, perpendicular to the median axis OO', are connected to the interconnection support 101 at the middle of the length of the cut-out 110, and the other portion 114 is extended at side 118, in the form of a circular arc 115 whose opening angle 116 opens onto the inside angle of the elbow jumper 112.

In addition, at the end 104 away from the monitoring means 300, two types of cut-out 150 and 155 are located alternately across the width of the plate 101. More precisely, two cut-outs 150 are located on one side of axis OO', while on the other side a cut-out 155 located close to axis OO' is followed by a cut-out 150 toward the outside.

The first type of cut-out 150, in the form of a circular arc 154 opening onto the exterior of the plate 101, includes a straight connection jumper 151, perpendicular to the median axis OO' and connected to the interconnection support 101 at its end 104.

It is extended by an eyelet 152 in the form of a circular arc whose opening angle 153 is facing the empty space of the cut-out 150.

The second type of cut-out 155 is an empty circular arc 156 opening onto the exterior of the interconnection plate 101.

At the end 102 close to the monitoring means, near the connection zone 140, are also located, alternately, two types of cut-out 120 and 121. More precisely, a pair of cut-outs 120 and 121 are located on each side of the axis OO', with the cut-outs 121 being placed close to axis OO'.

The first type of cut-out 120 includes a jumper 122 and an interconnection eyelet 123 as at the opposite end 104, the only difference being that the jumper 122 is shorter at the end 102 close to the monitoring means 300, due essentially to the narrowness of the plate 101 on this side.

The second cut-out 121 is a circular one.

Advantageously, the specific shape of the connection jumpers of the different cut-outs 110, 120 and 150 were chosen so as to obtain a maximum of length by overlapping as little as possible onto the area of the plate 101 which is intended to accommodate the conducting tracks of the circuit of the interconnection system 100.

In addition, the length of the jumpers allow them to be deformed by torsion in order to present the opening of the eyelets 115 facing the polar terminals 500 for which they are intended, as will be described later with reference to FIGS. 3, 4 and 5.

In addition, the general symmetry of the cut-outs and more particularly of the connection jumpers in relation to the median axis OO' allows balancing of the interconnection support 101 from the viewpoint of the forces that the jumpers will generate. In fact because of their elastic behaviour, they have a tendency to distance the interconnection eyelets 115, 123 and 152 from the polar terminals 500 to which they are going to be connected.

In an advantageous manner, the eyelets 115 of the retention means 110 present far from the ends of the system 10 have elbow jumpers 112 to have the same length as those of the eyelets 152 and 123 located at the edge of the interconnection system 100, while still not going beyond the empty parts 117 of the plate 101 cut-out for passage of the terminals 500 of cells, and not impeding the passage of the latter, with the general orientation of the eyelets remaining symmetrical in relation to the median axis of the system 100.

In addition, the interconnection system 100 includes reception fittings 130 for the heating plates 400 of the energy storage assembly 200.

The latter 130 take the form of several thin rectangular cut-outs 131 of which two opposite sides 132 and 133 are in the form of a convex circular arc, the other two 131 and 135 being rectilinear, equal and parallel along the interconnection system 100. They are preferably placed parallel to the median axis OO' of the central area 105 of the interconnection system 100.

A large variety of configurations of the retention means 110, 120 and 150 and reception fittings 130 can be designed onto the surface of the interconnection support 101 in order to optimise their role of mechanical and electrical connection to the polar terminals 500 of the cells, but also in order to optimise the space dedicated to the conducting circuit of the interconnection system 100 or again its conditions of manufacture.

In addition, the number, the area, the shape, the nature, and the orientation of the cut-outs can be the subject of many implementation variants. These are not limited to the illustrations provided in the appended figures.

The assembly of the interconnection support 100 with the polar terminals 500 of the energy-storage cells of the assembly 200 will now be described with reference to FIGS. 3, 4 and 5.

Figure 3:
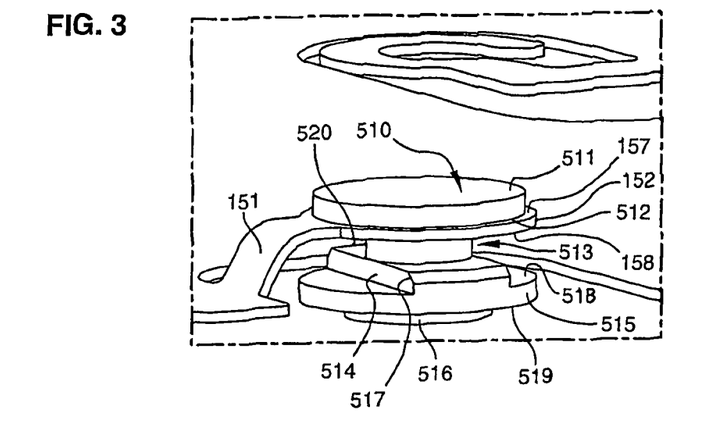
FIG. 3 illustrates a side view of the assembly of a polar terminal of an individual energy-storage cell with the interconnection system of the invention.

A polar terminal 500 of an individual cell, represented in FIG. 3, takes the form of a cylinder 513 whose role is to provide the electrical conduction from the interior of a cell, in which the electrochemical elements are located, to the exterior. This cylinder 513, shown in the figure, in fact is the main shaft 513 of the polar terminal 500 located perpendicularly to the interconnection support 101.

This cylinder 513 is extended by two annular shoulders 510 and 515 of larger diameter, a bottom shoulder 515 present at the bottom end of the cylinder 513, and a top shoulder 510 present at the top end of the cylinder 513.

By means of their internal faces 512 and 518, these form the branches of an annular channel 520.

In addition, at the bottom end of the cylinder 513, the bottom shoulder 515 is surmounted on its inner face 518 by a coaxial square stamping 514, which will be used for securing the polar terminal 500 on the top of the cell.

This stamping 514 is terminated by a chamfer 517 formed by a surface that converges toward the bottom shoulder 515 as one moves radially toward the exterior. This chamfer 517 will be used to facilitate the grip of the clamping tool on the polar terminal 500.

The bottom shoulder 515 is also extended, on its outer face 519, by a second coaxial cylinder 516, of smaller diameter, which will play the role of direct electrical connection with the electrochemical elements present inside the energy-storage cell (not illustrated in the figure).

Consider a cut-out 150 located on the end 104 farthest from the monitoring means 300 as illustrated in FIG. 3. The interconnection eyelet 152 slides sideways into the channel 520 formed by the two shoulders 510 and 515.

More precisely, its opening angle 153 engages in a complementary manner around the shaft 513 at the level of the aforementioned channel 520 in order to allow to the top surface 157 of the eyelet 152 to come into contact with the bottom part 512 of the top shoulder 510 of the polar terminal 500.

The opening angle 153 of the eyelet 152 is designed to trap the eyelet 152 in position on the shaft 513.

However there is a height difference between the bottom part 511 of the top shoulder 510 of the polar terminal 500 and the top surface 157 of the interconnection eyelet 152 of the interconnection support 101.

In order to bring these into mutual contact, the altitude difference is compensated for by means of the interconnection jumper 151 which deforms by torsion. The length of the jumper 151 will be used to deal with a difference of altitude between the eyelet 152 and the support 101 while still allowing the alignment of the eyelet 152 with the polar terminal 500.

In addition, the cells connected to the interconnection system 100 by means of their polar terminals 500 are connected to each other, and more precisely connected in series, as illustrated in FIG. 1.

Figure 4:
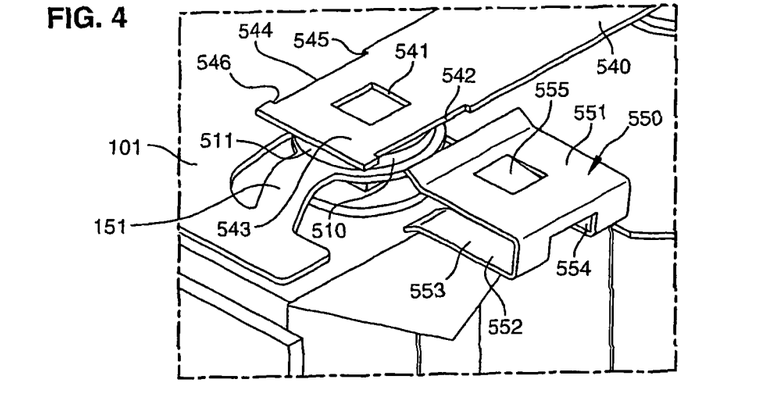
FIG. 4 illustrates a partial view, in perspective, of the assembly in series of polar terminals of energy-storage cells via the power-connection means.
Figure 5:
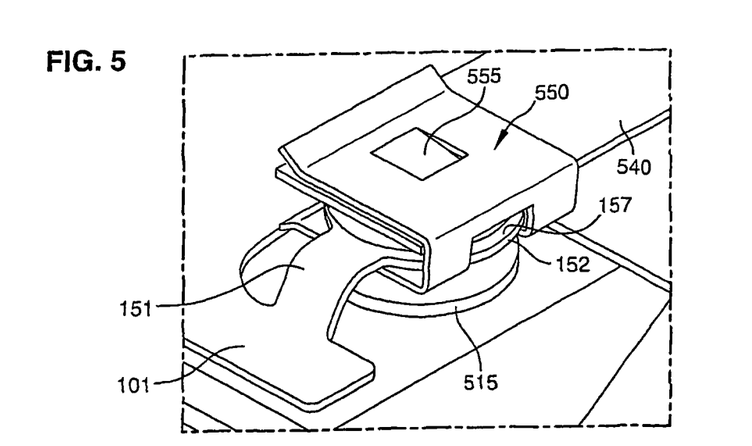
FIG. 5 illustrates a view in perspective of a polar terminal of an individual energy-storage cell assembled to a power connection system.

An example of a power connection system used to electrically connect the electrochemical cells is illustrated in FIGS. 4 and 5.

This system includes an electrically-conducting part 540 as well as two spring elements 550 for the connection in series of two polar terminals 500 of a pair of electrochemical cells.

As illustrated in FIG. 4, a polar terminal 500 of an individual cell is linked to a polar terminal 500 of the neighbouring cell (not illustrated) by a busbar 540 of substantially rectangular shape.

One end 543 of the busbar 540 is positioned flat, perpendicularly to the shaft 513 of the polar terminal 500, on the top face 511 of the top shoulder 510.

At this end 543, the busbar 540 has a square cut-out 541, centred on the shaft 513 of the polar terminal 500, which will act as a locating point for the installation of a spring element 550 that firstly makes the contact between the polar terminal 500 and the busbar 540, and secondly the contact between the polar terminal 500 and the eyelet 152.

On either side of the square cut-outs 541, this busbar 540 also includes at this end 543 U-shaped channels 542, 544 lying on each longitudinal side of the busbar 540. The channel branches are formed by the presence of a shoulder 545 with a width that is less than that of the busbar, extended by a second shoulder 546 of a width that is identical to that of the busbar 540.

The length of the opposite channels 542, 544 is identical, and corresponds substantially to the diameter of the polar terminal 500.

These channels 542, 544 will allow a part (not shown in the figure) playing the role of a contact between the polar terminal 500 and the busbar 540 to lock onto the latter 540.

This busbar 540 is preferably made of tinned copper.

The spring element 550 is composed of a clip 550. This ensures the bringing into contact of the stack composed of the interconnection eyelet 152, the top shoulder 510 of the polar terminal 500, the contact part, and the busbar 540, locking onto this assembly by sliding sideways perpendicularly to the shaft 513. It takes the form of a part of U-shaped cross-section whose two upper 551 and lower 552 branches are designed to be assembled respectively with the top face of the busbar 540 and with the interconnection eyelet 152 in contact with the bottom face 512 of the top shoulder 510.

The lower branch 552 of the spring element 550 is divided, over its length, into two identical brackets 553, 554, and this division is extended, perpendicularly to the shaft 513, on the intermediate portion of the clip 550.

The two bottom brackets 553, 554 make contact with the bottom face 158 of the interconnection eyelet 152, and the top branch 551 makes contact with the top face of the busbar 540.

As illustrated in FIG. 5, the eyelet 152 is put into in contact with the inner face 512 of the top shoulder 510 of the terminal 500 by means of the bottom brackets 553 and 554 of the clip 550.

In addition, the spring element 550 includes, on its top branch 551, a square locking lug 555, which is used to indicate the correct positioning of the device 550 on the fitting. During the sliding action, this lug 555 slips into the square cut-out 541 in the busbar 540, and is used to prevent the clip 550 from becoming dislodged from the polar terminal 500 due to the mechanical stresses experienced by the energy-storage assembly 200.

The spring element 550 is used to apply continuous compression forces to the energy-storage cells.

The nature of the power connection system between the energy-storage cells can be the subject of many implementation variants. This must not be limited to the illustration provided in the aforementioned FIGS. 3, 4 and 5.

Figure 6:
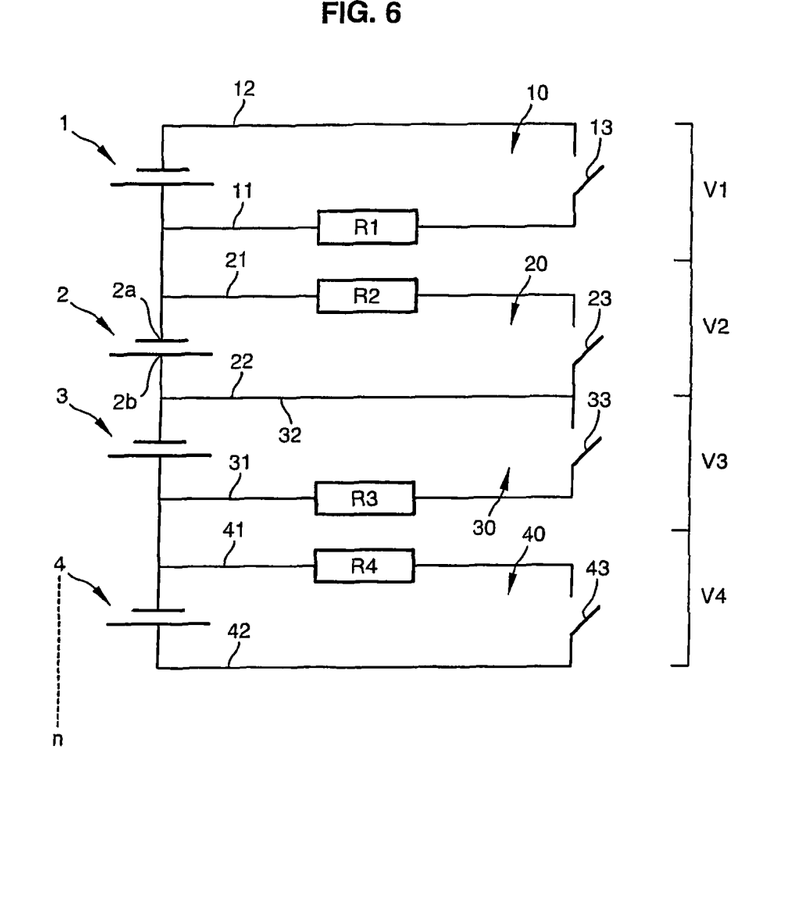
FIG. 6 illustrates a diagram of part of the electrical circuit of the interconnection system according to the invention.
Figure 7:
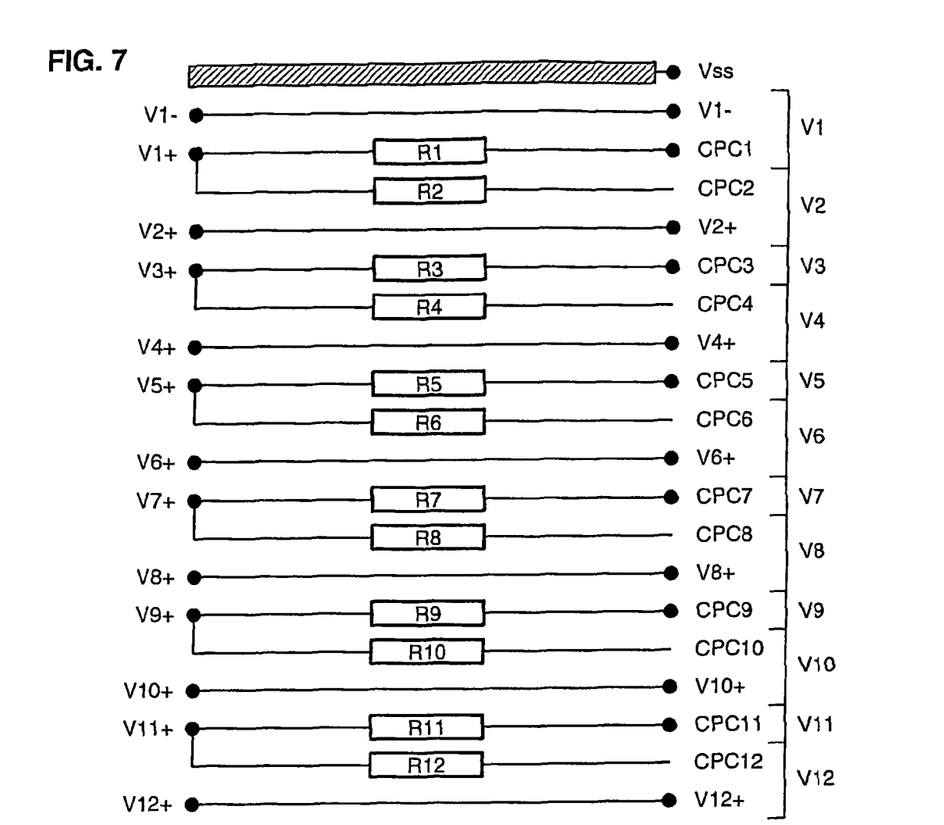
FIG. 7 illustrates a diagram of the potential-measuring points and of the power dissipation resistances of the conducting circuit of the interconnection system according to the invention.

FIGS. 6 and 7 provide the diagram electrical of the conducting printed circuit 800 formed on an electrically-conducting area of the plate 101 of the interconnection system 100, which will be used to connect the energy-storage assembly 200 to the means 300 for monitoring its state of health.

According to the invention, the interconnection support 101 includes an insulating substrate onto which a sheet of an electrically-conducting material is deposited.

This sheet is treated, in a manner that is known in itself, so as to incorporate the electrical tracks of the conducting circuit 800 of the interconnection system 100.

The support 101 is preferably composed of a thin sheet of aluminium on an insulating substrate of the polyester type.

The nature of the insulating substrate and that of the conducting sheet can be the subject of many implementation variants. In particular, the conducting area can be composed of a sheet of copper.

In addition, according to the invention, the interconnection system 100 is flexible. As illustrated in the aforementioned figures, this allows the torsion of the connection jumpers of the retention means 110, 120 and 150, and a configuration in three dimensions of the interconnection system 100.

Referring now to FIG. 6, a set of n energy-storage cells is illustrated connected in series.

According to the invention, each of the cells, 1 to n, is connected respectively to a circuit 10 to n0 configured so as to propose a voltage measuring circuit with on/off switching, indicating the energy state of an individual cell and a diversion circuit for the current passing through each cell, with on/off switching, depending on this energy state.

For an individual energy-storage cell 2, a diversion circuit 20 is connected in parallel with the cell 2. A conductor 21 forms a current diversion path starting from a polar terminal 2a of the cell 2 and leads to the monitoring means 300 of the energy-storage assembly 200 in which it is connected to an on/off switching means 23.

This on/off switching means 23 is also connected to a second track 22 which forms a current return path to the other polar terminal 2b of the cell 2.

The on/off switching means 23 is preferably a switch.

The presence of the on/off switching means 13 to n3 allows each diversion circuit 10 to n0 to operate independently of the other circuits connected to the other cells.

In an advantageous manner, the on/off switching means 13 to n3 are designed to electrically isolate the cell to be measured and at least one of the two cells adjacent to the cell to be measured.

In a preferred manner, the on/off switching means 13 to n3 are designed to electrically isolate the cell to be measured, and each of the two cells adjacent to the cell to be measured.

Thus all or part of each diversion circuit n0 is used as a measurement circuit for the corresponding cell, and conversely, the measurement circuit of a cell uses all or part of the diversion circuit n0 of the adjacent cells, this being used to limit the number of conductors present on the support 101 and to rationalise the drawing and the form of the conductors present.

In addition, according to the invention, each current diversion circuit n0 includes at least electrically resistive and thermally conducting element Rn playing the role of a current limiter.

This element Rn is preferably an energy dissipating resistance.

Thus, referring to the figure, the on/off switching means 23 of the diversion circuit 20 varies between a conducting state and a non-conducting state, and diverts a part of the current passing through the corresponding energy-storage cell 2 to the dissipating resistances of the assembly 200 when it is in the conducting state.

According to a preferred embodiment of the invention, the routing of the diversion circuits 10 to n0 is determined so as to connect the electrically-resistive and thermally-conducting elements Rn alternately to the positive polar terminal of an energy-storage cell and the negative terminal of the following energy-storage cell, with a view to limiting the number of conductors to be configured in the conducting area of the interconnection support 101.

This also applies to the current return tracks 12 to n2 of the diversion circuits 10 to n0.

In addition, with each cell 1 to n being connected in series with the other cells of the assembly 200 and to the interconnection support 101, a voltage level is produced and can be measured by the means 300 for monitoring the state of health of the energy-storage assembly 200.

According to one aspect of the invention, voltage measuring circuits for each of the energy-storage cells 1 to n of the assembly 200 are integrated into the conducting circuit 800.

In a preferred embodiment of the invention, these voltage measuring circuits are identical to the aforementioned diversion circuits 10 to n0.

However, some of the diversion circuits 10 to n0 are not used for voltage measurement when it is found that they are supplying a measurement that is redundant with a measurement that has already been effected. Thus, it is possible to reduce the number of measurement circuits of the monitoring means 300 so as to accomplish the surveillance of all the energy-storage cells.

For example, referring to the figure, for energy storage cell 1, the conducting tracks 11 and 12 forming the diversion circuit 10 correspond to the conducting tracks forming the measurement path V1 of this particular cell 1.

For storage cell 2, the measurement path of this particular cell 2 corresponds to tracks 11 and 22.

Potential detection lines 11 and 22 extend on either side of the cell 2 to a voltage detection circuit present on the means 300 for monitoring the state of health of the assembly 200.

In order to perform the measurement of voltage with a certain precision, it is necessary to place not only the on/off switching means 23 controlling the diversion circuit 20 concerned in a non-conducting state, but also the means (13 and 33) for activating the adjacent diversion circuits that have conductors (11 and 22) that are common with the measurement circuit of V2.

Likewise, in order to perform the measurement of cell 3, it will be necessary to suppress all current in the tracks (22 and 31) and so to place the means of activation 23 and 43 in a non-conducting state.

The placing of the diversion circuits in a non-conducting state has as its objective to cope with the voltage drop generated in the conducting tracks by the passage of current, which would be added to the voltage value to be measured and would falsify the measurement.

An example of the different potential measurement lines of an electrical circuit 800 configure for an interconnection system 100 according to the invention is represented in FIG. 7 for an assembly 200 of twelve energy-storage cells.

Lines Vn+ and Vn− respectively represent the potentials measured at the level of the positive polar terminal 500 and of the negative polar terminal 500 of the energy-storage cells.

In addition, lines CPC1 to CPC12 respectively represent the potentials measured at the level of the conducting tracks, that includes the power dissipation resistances of energy-storage cells 1 to 12.

Preferably, in order to effect the voltage measurements, switches 13 to n3 are cabled between each pair of tracks (Vn, CPCn) of an individual energy-storage cell.

The electrically-conducting area of the interconnection support 101 is treated with a view to presenting the aforementioned conducting printed circuit 800 with reference to FIGS. 6 and 7.

Advantageously, the electrical contact between the conducting printed circuit 800 and the polar terminals 500 of the energy-storage cells is created, in a manner that is known in itself, by soldering/welding, brazing or glueing.

More precisely, for an individual polar terminal 500 as illustrated in FIG. 3, the brazed, soldered or glued contact is established by the bringing into contact with an interconnection eyelet 152 of a cut-out 150 presenting, on its bared top area 157, a part of the conducting circuit 800, with the inner face 512 of the top shoulder 510 of the polar terminal 500.

According to a preferred embodiment of the invention, the conducting tracks of each diversion/measuring circuit 10 to n0 are configured so as to extend, from each cut-out 110, 120 and 150 intended to receive the polar terminals 500 of the cells, longitudinally, along the length of the interconnection support 101 to the end 102 close to the monitoring means 300.

At this end 102 they are connected to an electrical termination, which is known in itself, that includes the number of paths necessary.

This electrical termination is preferably a connector 930 that is crimped or soldered onto the interconnection support 101.

Figure 8:
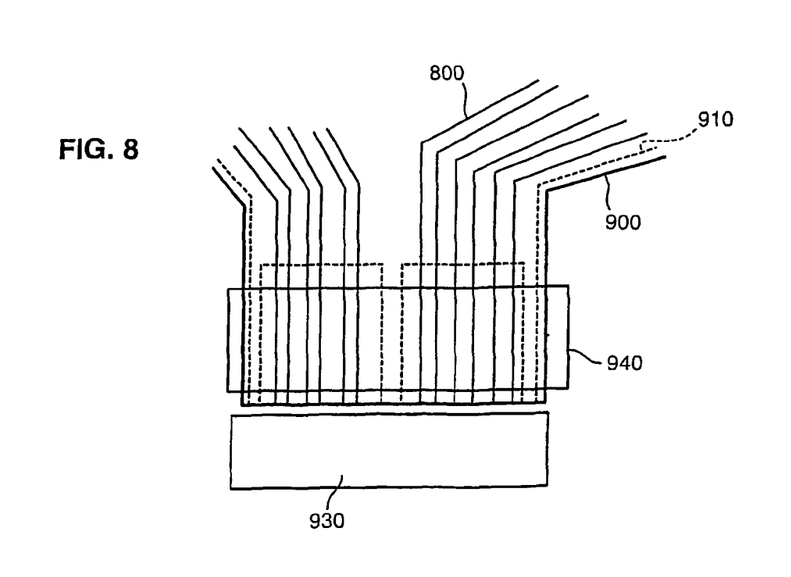
FIG. 8 is a schematic view of the connection zone of an interconnection system according to the invention with an electronic control support.

It connects the conducting printed circuit 800 to a connection socket on the monitoring means 300 via a connection zone 940 that includes contacts of the stapled type.

In addition, advantageously, a single and same interconnection eyelet is used to connect all the tracks coming or starting from the terminals of adjacent cells connected to each other thus creating a point of the same electrical potential.

In addition, the conducting tracks determined by the presence of electrically-resistive and thermally-conducting current limiting elements Rn must have a given resistance.

To this end, according to the rules for routing of the conducting tracks, we choose a track length/width pair to suit the resistivity that we seek.

According to another aspect of the invention, the power dissipation resistances Rn are composed of current tracks of the conducting circuit 800 and, more precisely, of the measurement and diversion circuit of each cell 10 to n0, with the value of the said resistances Rn being composed of the routing resistance of the corresponding track between the terminal of the cell to be bypassed and the system to be monitored 300.

The lengths of the power dissipation resistances Rn associated with each cell, which are of constant section, are chosen so as to all be identical, whatever the positioning of the cell in relation to the interconnection system 100.

The integration into the conducting circuit 800 of resistive elements R1 to Rn results in the dissipation of heat in the support 101 of the interconnection system 100.

According to one aspect of the invention, the layout of the resistive tracks is optimised to best cover the whole area of the interconnection support 101 in order to avoid an excessively high surface energy density and not to excessively unbalance the thermal homogeneity of the energy-storage assembly 200.

In addition, the routing section of the tracks is chosen to be constant over all of their length in order to distribute the thermal dissipation of each resistance over all of the interconnection system 100.

In addition, the dissipation resistance R1 to Rn associated with a given cell runs in front of a maximum of adjacent cells in order to best distribute the energy dissipated in all of the cells other than the bypassed cell.

The energy recovered by means of these configurations by the energy-storage cells contributes to maintaining the temperature of the energy-storage assembly 200. The energy consumed by the heating plates for the thermal regulation of the assembly 200 is thus advantageously reduced.

It is also specified that since the return tracks must have a maximum value that is less than a threshold fixed by the functioning of the system to be monitored 300, the said return tracks are created with a section that is as large as possible and with a run that is as short and as straight as possible between the terminal of the connected cell and the system to be monitored 300, with allowance made for the dimensions of the interconnection support 101, in order to minimise the value of the resistance of each return track.

Finally, according to a preferred embodiment of the invention, the interconnection system 100 is also glued or retained by the compression of a thickness of an elastic material on the tops of the cells with a view to optimising the thermal coupling.

This material is preferably of the elastomer or cellular type.

One implementation variant of the invention proposes to increase or reduce the thickness of the conducting area in order to obtain the best compromise regarding the section of the conducting tracks, if the conducting area of the interconnection support 101 is not sufficient to achieve the compromise between the width and length of the conductors.

According to another aspect of the invention, the interconnection system 100 also includes a screen 910 to protect the conducting printed circuit 800 from electromagnetic interference.

According to the invention, this screen 910 is a layer of conducting material that is separated from the conducting printed circuit 800 by a layer of insulation 900, as illustrated in FIG. 8.

In a preferred execution variant, the shield layer 910 can cover the whole of the interconnection support 100, with the exception of the retention means 110, 120 and 150 and the zone 940 for connecting the conducting circuit 800 to the electronic control support 300.

Returning to FIG. 7, this shield layer, which is at potential Vss, is connected electrically toward the end 102 close to the monitoring means 300, to the earth plane of the latter, by means of connector 930.

Implementation variants of this present invention concern an interconnection system 100 presenting an interconnection support 101 that is of double-sided or even multi-layer structure.

A non-limiting example of a multi-layer interconnection support 101 would have three conducting layers each respectively configured so as to include the conducting resistive tracks, the screen and the current return tracks.

The arrangement, the nature, the number of layers can be the subject of many implementation variants. In particular, one might mention the addition of an extra layer providing a power feed for the heating resistances of the energy-storage assembly 200.

Another implementation variant proposes the presence of zones on the interconnection support that are intended for the fitting of electronic components and, more particularly components of the CMS type.

In a typical operating mode of an energy-storage assembly 200 equipped with the interconnection system 100 according to the invention, the energy-storage cells, connected in series and interconnected with the interconnection system 100, produce a load current that is delivered to an element that is consuming energy.

In normal conditions, each of the diversion circuits 10 to n0 that is tested by the monitoring means 300 remains in a non-active state so as not to interfere with the passage of current through the connected cells.

In response to the measurement of a voltage in a particular energy-storage cell n that reaches a given setpoint level, the diversion circuit n0 dedicated to this cell n is switched on and the load current bypasses the defective cell n until its voltage reduces, to be conducted the other energy-storage cells. This diversion will dissipate energy over the whole area of the interconnection system 100.

Those skilled in the art will be appreciative of an interconnection system that, in relation to the known devices of the state of the art, can be used in a simple, reliable and efficient manner for any high-energy battery technology. It is possible to mention, as non-limiting examples, the lithium polymer, nickel metal hydride, or indeed the lithium ion technologies.

In addition, the interconnection system 100 according to the invention includes a flexibility that allows it to adapt its configuration to the energy-storage assembly 200 for which it is intended while still proposing a precise electrical connection.

Finally, the interconnection system 100 according to the invention offers the advantage of having non-unitary power dissipation resistances R1 to Rn which firstly allow efficient diversion of current in the presence of a defective cell, and secondly improve the thermal regulation of the energy-storage assembly 200.

Naturally, this present invention is not limited to the particular implementation methods that have just been described but extends to any variant that conforms to its spirit. In particular, this present invention is not limited to the appended drawings. The specific references illustrated in the preceding paragraphs are non-limiting examples of the invention.

The invention claimed is:

1. A system for the interconnection of energy-storage cells, connected electrically so as to form an energy-storage assembly (200), with an electronic control support (300) configured to monitor the state of health of the energy-storage cells and the energy storage assembly, each of said energy-storage cells being equipped on its top with polar terminals (500), and an interconnection system (100), wherein said interconnection system includes a flexible conducting circuit (800) formed on an electrically-conducting surface, said circuit (800) forming an electrical connection between the electronic control support (300) to which it is connected by the use of connection means and the polar terminals (500) to which it is connected by the use of retention means (110, 120, 150) carried by the interconnection system (100), with the retention means (110, 120, 150) firstly being configured to come into contact on the polar terminals (500) with support means (510) so as to arrange the polar terminals (500) on an interconnection support (101), and secondly being configured to provide a direct electrical connection of the polar terminals to the circuit, wherein for each of the energy-storage cells, the conducting circuit (800) includes a voltage measuring circuit at the terminals of each cell, with on/off switching, to indicate an energy state of the cell, and a diversion circuit (10, 20 . . . n0) of the current passing through each cell with on/off switching, according to the energy state of the cell, said diversion circuit being designed at least with current limiting elements (R1, . . . , Rn), wherein all or part of said diversion circuit is used as a measurement circuit for the corresponding cell, and wherein the voltage measuring circuit of a cell uses all or part of the diversion circuit of the adjacent cells.

2. A system according to claim 1, wherein the current limiting elements R1, . . . , Rn) are power dissipation resistances.

3. A system according to claim 1, wherein the current limiting elements are designed to be connected alternately to the positive polar terminal (500) of an energy-storage cell and to the negative polar terminal (500) of the following energy-storage cell.

4. A system according to claim 1, wherein the voltage measuring circuits and the diversion circuits are put in an active or inactive state by the use of an on/off switching means (13, 23, . . . , n3) connected in parallel with an individual energy-storage cell, said on/off switching means (13, 23, . . . n3) varying between a conducting state and a non-conducting state, are designed to measure a voltage at the terminals of an energy-storage cell when they are in the non-conducting state, and to divert a part of the current passing through the corresponding energy-storage cell to the current limiting elements (R1, Rn) when they are in the conducting state.

5. A system according to claim 3, wherein the current limiting elements (R1, Rn) are composed of current tracks of the conducting circuit (800) (R1, Rn), with the value of said elements being composed of the routing resistance of the corresponding track between the terminal of the cell to be bypassed and the electronic system to be controlled (300).

6. A system according to claim 5, wherein the routing resistance of said track is chosen to be constant over all of its length in order to spread the heat dissipation of the current limiting element (R1 to Rn) over all of the interconnection system (100).

7. A system according to claim 2, wherein the lengths of the power dissipation resistances (R1, Rn) associated with each cell, of constant section, are all identical, whatever the positioning of the cell in relation to the interconnection system (100).

8. A system according to claim 4, wherein the dissipating resistance (R1, Rn) associated with a given cell runs in front of a maximum of adjacent cells in order to spread the energy dissipated in all of the cells, other than the bypassed cell, as much as possible.

9. A system according to claim 4, wherein the on/off switching means (13, 23, . . . , n3) are designed to electrically isolate the cell to be measured, and at least one of the two cells adjacent to the cell to be measured.

10. A system according claim 4, wherein the on/off switching means (13, 23, . . . , n3) are designed to electrically isolate the cell to be measured and each of the two cells adjacent to the cell to be measured.

11. A system according to claim 1, wherein conducting circuit (800) also includes return tracks between the terminal of the connected cell and the electronic system to be monitored (300).

12. A system according to claim 1, wherein each diversion circuit (10, 20, n0) and measuring circuit is designed to be activated independently of the others.

13. A system according to claim 1, wherein, for an individual polar terminal (500), the retention means (110, 120, 150) are composed of an interconnection eyelet (115, 123, 152) that is articulated by an interconnection jumper (112, 122, 151), by means of torsion that brings the eyelet into contact with the aid of pressure means, on the polar terminal (500), composed of an annular shoulder (510).

14. A system according to claim 13, wherein a single and given interconnection eyelet (115, 123, 152) is used to connect all the tracks of the conducting circuit (800) coming or starting from the terminals (500) of adjacent cells connected to each other, thus creating a point at the same electrical potential.

15. A system according to claim 13, wherein the orientation of the interconnection eyelets (115, 123, 152) is symmetrical in relation to the longitudinal axis of the system.

16. A system according to claim 1, wherein the interconnection support (101) is composed of an insulating substrate of the polyester type, and of an electrically-conducting aluminium surface.

17. A system according to claim 1, wherein it also includes means for protection against electromagnetic interference.

18. A system according to claim 17, wherein the means for protection against electromagnetic interference are composed of a shield layer (910), insulated from the conducting circuit (800) and connected electrically to an earth plane of the electronic control support (300).

19. A system according to claim 18, wherein the shield layer (910) extends over the entirety of the interconnection support (101), with the exception of the retention means (110, 120, 150) and of the connection zone of the tracks of the conducting circuit (800).

20. A system according to claim 1, further comprising power connection means, which are designed to connect the energy-storage cells of the energy-storage assembly (200) in series with each other.

21. A system according to claim 20, wherein said power-connection means include an electrically-conducting connecting part (540) and spring elements (550) to connect together two polar terminals (500) of two juxtaposed energy-storage cells.

22. A system according to claim 1, wherein the energy-storage cells forming the energy-storage assembly (200) are cells selected from hybrid metal hydride cells, lithium ion cells, or lithium polymer cells.

23. An energy-storage assembly (200) formed from an assembly of energy-storage cells connected electrically to each other, which includes an interconnection system (100) of energy-storage cells, connected electrically so as to form the energy-storage assembly (200), with an electronic control support (300), configured to monitor the state of health of the energy-storage cells and the energy storage assembly, each of said energy-storage cells being equipped on its top with polar terminals (500), and the interconnection system (100), wherein said interconnection system) includes a flexible conducting circuit (800) formed on an electrically-conducting surface, said circuit (800) forming an electrical connection between the electronic control support (300) to which it is connected by the use of connection means and the polar terminals (500) to which it is connected by the use of retention means (110, 120, 150) carried by the interconnection system (100), with the retention means (110, 120, 150) firstly being configured to come into contact on the polar terminals (500) with support means (510) so as to arrange the polar terminals (500) on an interconnection support (101) to the polar terminals (500) on the interconnection support (101), and secondly being configured to provide a direct electrical connection of the polar terminals to the circuit, wherein
  for each of the energy-storage cells, the conducting circuit (800) includes a voltage measuring circuit at the terminals of each cell, with on/off switching, to indicate an energy state of the cell, and a diversion circuit (10, 20 . . . n0) of the current passing through each cell with on/off switching, according to the energy state of the cell, said diversion circuit being designed at least with current limiting elements (R1, . . . , Rn), wherein all or part of said diversion circuit is used as a measurement circuit for the corresponding cell, and
  wherein the voltage measuring circuit of a cell uses all or part of the diversion circuit of the adjacent cells.

24. A method for the interconnection of several energy-storage cells, connected electrically so as to form an energy-storage assembly (200), with an electronic control support (300), each of the said energy-storage cells being equipped on its top with polar terminals (500), wherein the method implements an interconnection stage created at least by:
  the formation of a conducting circuit (800) on an electrically-conducting area of a flexible interconnection support (101) deposited on the top of the said cells, with said circuit (800) forming an electrical connection between the electronic control support (300) and the polar terminals (500) of each cell;
  the connection to said conducting circuit (800) of the electronic control support (300);
  the bringing into contact of a support means (512) of the polar terminals (500) with a retention means (110, 120, 150) of the interconnection support (101), so as to place creating polar terminals (500) on the interconnection support (101);
  the direct electrical connection of support means (510) of the polar terminals (500) with the retention means (110, 120, 150) of the interconnection support (101);
  wherein for each of the energy-storage cells, the conducting circuit (800) includes a voltage measuring circuit at the terminals of each cell, with on/off switching, indicating an energy state of the cell, and a diversion circuit (10, 20, n0) for the current passing through each cell with on/off switching, according to the energy state of an individual cell, said diversion circuit being formed at least by current limiting elements (R1, . . . , Rn);
  wherein all or part of said diversion circuit (10, 20, n0) is used as a measurement circuit for the corresponding cell; and
  wherein the voltage measuring circuit of a cell uses all or part of the diversion circuit of the adjacent cells.

25. A method according to claim 24, wherein the current limiting elements (R1, Rn) are power dissipation resistances.

26. A method according to claim 24, wherein the current-limiting elements are connected alternately to a positive polar terminal (500) of an energy-storage cell and to a negative polar terminal (500) of the following energy-storage cell.

27. A method according to claim 24, wherein each of the measuring circuits and the diversion circuits (10, 20, n0) are put into an activated/de-activated state by the use of an on/off switching means (13, 23, . . . , n3) connected in parallel with an individual energy-storage cell, with the said on/off switching means (13, 23, . . . , n3), varying between a conducting state and a non-conducting state, measuring a voltage at the terminals of an individual energy-storage cell when they are in the non-conducting state and diverting a part of the current passing through the corresponding energy-storage cell to the current limiting elements (R1, Rn) when they are in the conducting state.

28. A method according to claim 24, wherein each diversion circuit (10, 20, n0) and measuring circuit can be activated independently of the others.

29. A method according to claim 28, wherein the on/off switching means (13, 23, . . . , n3) is designed to electrically isolate the cell to be measured and at least one of the two cells adjacent to the cell to be measured.

30. A method according to claim 28, wherein the on/off switching means (13, 23, . . . , n3) are designed to electrically isolate the cell to be measured and each of the two cells adjacent to the cell to be measured.

31. A method according to claim 24, further comprising protecting the interconnection support (101) against electromagnetic interference.

32. A method according to claim 24, wherein the interconnection support (101) is composed of a layer of aluminum deposited onto a flexible insulating substrate of the polyester type.

33. A method according to claim 24, further comprising implementing a stage for the connection in series of the energy-storage cells of the energy-storage assembly (200), by connecting each pair formed from two polar terminals (500) of two adjacent cells, by means of an electrically-conducting connecting part (540) and spring devices (550).

34. A system according to claim 1, wherein the electronic control support (300) extends perpendicularly to a top face of the assembly containing polar terminals of the energy-storage cells and the flexible interconnection support comprises two perpendicular portions of an elbow, one portion in contact with polar terminals of the energy-storage and the other perpendicular portion in contact with the electronic control support.

35. A system according to claim 1, wherein the flexible interconnection support comprises a plurality of connection parts which are linked to the interconnection support by respective flexible connection jumpers, torsion of the flexible connection jumpers allowing a configuration in three dimensions of the interconnecting support.

* * * * *

UNITED STATES PATENT AND TRADEMARK OFFICE
CERTIFICATE OF CORRECTION

PATENT NO. : 8,431,260 B2
APPLICATION NO. : 11/988959
DATED : April 30, 2013
INVENTOR(S) : Luc Nedelec Page 1 of 1

It is certified that error appears in the above-identified patent and that said Letters Patent is hereby corrected as shown below:

In the Claims, Column 13, Claim 5, line 55, please delete "claim 3" and insert --claim 1--.

Signed and Sealed this
Third Day of September, 2013

Teresa Stanek Rea
*Acting Director of the United States Patent and Trademark Office*

UNITED STATES PATENT AND TRADEMARK OFFICE
CERTIFICATE OF CORRECTION

| | |
|---|---|
| PATENT NO. | : 8,431,260 B2 |
| APPLICATION NO. | : 11/988959 |
| DATED | : April 30, 2013 |
| INVENTOR(S) | : Luc Nedelec |

It is certified that error appears in the above-identified patent and that said Letters Patent is hereby corrected as shown below:

In the Claims, Column 14, Claim 8, line 4, delete "claim 4" and insert --claim 2--.

Signed and Sealed this
Twenty-first Day of October, 2014

Michelle K. Lee
*Deputy Director of the United States Patent and Trademark Office*